(12) United States Patent
Vouche et al.

(10) Patent No.: US 10,551,126 B2
(45) Date of Patent: Feb. 4, 2020

(54) MODULAR AIR COOLED CONDENSER APPARATUS AND METHOD

(71) Applicant: SPX DRY COOLING USA LLC, Overland Park, KS (US)

(72) Inventors: Michel Vouche, Marbais (BE); Christophe Deleplanque, Brussels (BE); Fabien Fauconnier, Le Roeulx (BE)

(73) Assignee: SPG Dry Cooling USA LLC, Overland Park, KS (US)

( * ) Notice: Subject to any disclaimer, the term of this patent is extended or adjusted under 35 U.S.C. 154(b) by 0 days.

(21) Appl. No.: 16/196,840

(22) Filed: Nov. 20, 2018

(65) Prior Publication Data
US 2019/0086151 A1 Mar. 21, 2019

Related U.S. Application Data

(63) Continuation of application No. 14/812,513, filed on Jul. 29, 2015, now abandoned, which is a
(Continued)

(51) Int. Cl.
*F24H 3/00* (2006.01)
*F28B 1/06* (2006.01)
(Continued)

(52) U.S. Cl.
CPC .............. *F28B 1/06* (2013.01); *B23P 15/26* (2013.01); *F28B 7/00* (2013.01); *F28B 9/02* (2013.01); *Y10T 29/4935* (2015.01)

(58) Field of Classification Search
CPC ...... F28B 1/06; F28B 9/02; F28B 7/00; F28C 1/14; B23P 15/26; Y10T 29/4935
See application file for complete search history.

(56) References Cited

U.S. PATENT DOCUMENTS

| 3,204,693 A | 9/1965 | Kuhn |
| 3,384,165 A | 5/1968 | Mathews |

(Continued)

FOREIGN PATENT DOCUMENTS

| CN | 1185205 | 6/1998 |
| CN | 101568790 | 10/2009 |

(Continued)

OTHER PUBLICATIONS

United States Patent and Trademark Office, "Restriction Requirement," issued in connection with U.S. Appl. No. 13/478,827, dated Jan. 5, 2015, 7 pages.

(Continued)

*Primary Examiner* — Henry T Crenshaw
*Assistant Examiner* — Kamran Tavakoldavani
(74) *Attorney, Agent, or Firm* — Hanley, Flight and Zimmerman, LLC

(57) ABSTRACT

Modular air cooled condenser apparatus and related methods are disclosed. An example mechanical draft modular air cooled condenser disclosed herein includes an example condenser module that includes a plenum and a first condenser bundle having a first set of tubes having first ends and second ends and a first condensate header connected to the second ends of the tubes. The example condenser module also includes a second condenser bundle having a second set of tubes having third ends and fourth ends and a second condensate header connected to the fourth ends of the second set of tubes. In addition, the condenser module includes a third condenser bundle having a third set of tubes having fifth ends and sixth ends and a third condensate header connected to the sixth ends of the third set of tubes. The condenser module also includes a fourth condenser bundle having a fourth set of tubes having seventh ends and eighth ends and a fourth condensate header connected to the
(Continued)

eighth ends of the fourth set of tubes. The condenser module further includes a shroud that houses a single fan, the single fan positioned to create a draft to flow over the first condenser bundle, over the second condenser bundle, over the third condenser bundle, and over the fourth condenser bundle. In addition, the condenser module includer a support frame that supports the first, second, third, and fourth condenser bundles.

20 Claims, 5 Drawing Sheets

Related U.S. Application Data continuation of application No. 13/478,827, filed on May 23, 2012, now Pat. No. 9,551,532.

(51) Int. Cl.
  *B23P 15/26*  (2006.01)
  *F28B 7/00*  (2006.01)
  *F28B 9/02*  (2006.01)

(56) References Cited

U.S. PATENT DOCUMENTS

| | | | |
|---|---|---|---|
| 3,519,068 A | | 7/1970 | Harris et al. |
| 3,630,273 A | † | 12/1971 | La Haye |
| 3,685,579 A | | 8/1972 | Spangemacher |
| 3,707,185 A | | 12/1972 | Modine et al. |
| 3,976,127 A | | 8/1976 | Harris |
| 4,076,771 A | | 2/1978 | Houx, Jr. et al. |
| 4,367,183 A | | 1/1983 | Carbonaro |
| 4,470,271 A | † | 9/1984 | Draper |
| 4,513,813 A | * | 4/1985 | Zanobini ............... F28B 1/06 165/110 |
| 4,913,710 A | | 4/1990 | Reverdv |
| 4,926,931 A | | 5/1990 | Larinoff |
| 4,949,543 A | | 8/1990 | Cottone et al. |
| 5,007,501 A | | 4/1991 | Baston |
| 5,098,006 A | | 3/1992 | McManus |
| 5,301,746 A | | 4/1994 | Trage et al. |
| 5,851,446 A | | 12/1998 | Bardo et al. |
| 5,902,522 A | | 5/1999 | Seawell et al. |
| 5,966,809 A | | 10/1999 | Pierce |
| 6,378,605 B1 | * | 4/2002 | Kutscher ............... F28B 1/06 165/181 |
| 6,474,272 B2 | | 11/2002 | Bensing et al. |
| 7,610,949 B2 | | 11/2009 | Palanchon |
| 7,926,555 B2 | | 4/2011 | Sanderlin et al. |
| 8,166,776 B2 | | 5/2012 | Kopko et al. |
| 9,551,532 B2 | | 1/2017 | Vouche et al. |
| 9,951,994 B2 | | 4/2018 | Vouche et al. |
| 2002/0005176 A1 | | 1/2002 | Bensing et al. |
| 2008/0160902 A1 | | 7/2008 | Desler |
| 2009/0165993 A1 | | 7/2009 | Yang et al. |
| 2009/0211743 A1 | | 8/2009 | Schrader et al. |
| 2009/0220334 A1 | * | 9/2009 | Vouche ............... F04D 29/664 415/119 |
| 2010/0044010 A1 | | 2/2010 | Corser et al. |
| 2010/0078147 A1 | | 4/2010 | Samyn et al. |
| 2010/0132917 A1 | | 6/2010 | Runk et al. |
| 2010/0147487 A1 | | 6/2010 | Lewandowski et al. |
| 2010/0263840 A1 | * | 10/2010 | Nobel ............... F28B 1/06 165/120 |
| 2012/0023940 A1 | | 2/2012 | Kitz et al. |
| 2014/0150989 A1 | | 6/2014 | Eindhoven |
| 2014/0367243 A1 | | 12/2014 | Kroger et al. |
| 2015/0204611 A1 | | 7/2015 | Vouche et al. |
| 2015/0330709 A1 | * | 11/2015 | Vouche ............... F28B 1/06 202/185.3 |
| 2017/0363358 A1 | | 12/2017 | Bugler, III et al. |

FOREIGN PATENT DOCUMENTS

| | | |
|---|---|---|
| CN | 101655322 | 2/2010 |
| EP | 0346848 | 12/1989 |
| GB | 464531 A † | 4/1937 |
| GB | 908806 | 10/1962 |
| WO | 2010125017 | 11/2010 |

OTHER PUBLICATIONS

United States Patent and Trademark Office, "Non-Final Office Action," issued in connection with U.S. Appl. No. 13/478,827, dated Apr. 10, 2015, 23 pages.
United States Patent and Trademark Office, "Final Office Action," issued in connection with U.S. Appl. No. 13/478,827, dated Oct. 16, 2015, 17 pages.
United States Patent and Trademark Office, "Notice of Allowance," issued in connection with U.S. Appl. No. 13/478,827, dated Sep. 16, 2016, 18 pages.
United States Patent and Trademark Office, "Final Office Action," issued in connection with U.S. Appl. No. 14/504,570, dated Aug. 8, 2017, 25 pages.
United States Patent and Trademark Office, "Non-Final Office Action," issued in connection with U.S. Appl. No. 14/504,570, dated Jan. 12, 2017, 38 pages.
United States Patent and Trademark Office, "Notice of Allowance," issued in connection with U.S. Appl. No. 14/504,570, dated Jan. 4, 2018, 12 pages.
United States Patent and Trademark Office, "Non-Final Office Action," issued in connection with U.S. Appl. No. 14/812,513, dated Feb. 6, 2018, 33 pages.
United States Patent and Trademark Office, "Final Office Action," issued in connection with U.S. Appl. No. 14/812,513, dated Aug. 2, 2018, 27 pages.
United States Patent and Trademark Office, "Restriction Requirement," issued in connection with U.S. Appl. No. 14/812,513, dated Apr. 18, 2017, 6 pages.
United States Patent and Trademark Office, "Non-Final Office action," issued in connection with U.S. Appl. No. 14/812,513, dated Dec. 5, 2018, 45 pages.
United States Patent and Trademark Office, "Non-Final office action," issued in connection with U.S. Appl. No. 16/515,363, dated Oct. 10, 2019, 67 pages.
Chinese Patent Office, "First Office action," issued in connection with Chinese patent application No. 2013101959209, dated Nov. 23, 2015, 11 pages.
International Searching Authority, "Search Report and Written Opinion," issued in connection with PCT patent application No. PCT/US2014/039718, dated Oct. 7, 2014, 9 pages.
International Searching Authority, "International Preliminary Report on Patentability," issued in connection with PCT patent application No. PCT/US2014/039718, dated Dec. 1, 2015, 8 pages.

\* cited by examiner
† cited by third party

000
MODULAR AIR COOLED CONDENSER APPARATUS AND METHOD

CROSS-REFERENCE TO RELATED APPLICATIONS

This patent arises as a continuation of U.S. patent application Ser. No. 14/812,513, entitled MODULAR AIR COOLED CONDENSER APPARATUS AND METHOD, filed Jul. 29, 2015, which is a continuation of U.S. patent application Ser. No. 13/478,827, entitled MODULAR AIR COOLED CONDENSER APPARATUS AND METHOD, filed May 23, 2012, now U.S. Pat. No. 9,551,532. This application claims priority to U.S. patent application Ser. No. 14/812,513 and U.S. patent application Ser. No. 13/478,827. U.S. patent application Ser. No. 14/812,513 and U.S. patent application Ser. No. 13/478,827 are hereby incorporated by reference in their entireties.

FIELD OF THE INVENTION

The present invention relates to a mechanical draft cooling tower that utilizes air cooled condenser modules. The aforementioned cooling tower operates by mechanical draft and achieves the exchange of heat between two fluids such as atmospheric air, ordinarily, and another fluid which is usually steam or some sort of industrial process fluid. The aforementioned cooling tower operates by mechanical draft which utilizes an air current generator such as a fan or the like.

BACKGROUND OF THE INVENTION

Cooling towers are heat exchangers of a type widely used to emanate low grade heat to the atmosphere and are typically utilized in electricity generation, air conditioning installations and the like. In a mechanical draft cooling tower for the aforementioned applications, airflow is induced or forced via an air flow generator such as a driven impeller, driven fan or the like. Cooling towers may be wet or dry. Dry cooling towers can be either "direct dry," in which steam is directly condensed by air passing over a heat exchange medium containing the steam or an "indirect dry" type cooling towers, in which the steam first passes through a surface condenser cooled by a fluid and this warmed fluid is sent to a cooling tower heat exchanger where the fluid remains isolated from the air, similar to an automobile radiator. Dry cooling has the advantage of no evaporative water losses. Both types of dry cooling towers dissipate heat by conduction and convection and both types are presently in use. Wet cooling towers provide direct air contact to a fluid being cooled. Wet cooling towers benefit from the latent heat of vaporization which provides for very efficient heat transfer but at the expense of evaporating a small percentage of the circulating fluid.

To accomplish the required direct dry cooling the condenser typically requires a large surface area to dissipate the thermal energy in the gas or steam and oftentimes may present several challenges to the design engineer. It sometimes can be difficult to efficiently and effectively direct the steam to all the inner surface areas of the condenser because of non-uniformity in the delivery of the steam due to system ducting pressure losses and velocity distribution. Therefore, uniform steam distribution is desirable in air cooled condensers and is critical for optimum performance. Another challenge or drawback is, while it is desirable to provide a large surface area, steam side pressure drop may be generated thus increasing turbine back pressure and consequently reducing efficiency of the power plant. Therefore it is desirous to have a condenser with a strategic layout of ducting and condenser surfaces that allows for an even distribution of steam throughout the condenser, that reduces back pressure, while permitting a maximum of cooling airflow throughout and across the condenser surfaces.

Another drawback to the current air cooled condenser towers is that they are typically very labor intensive in their assembly at the job site. The assembly of such towers oftentimes requires a dedicated labor force, investing a large amount of hours. Accordingly, such assembly is labor intensive requiring a large amount of time and therefore can be costly. Accordingly, it is desirable and more efficient to assemble as much of the tower structure at the manufacturing plant or facility, prior to shipping it to the installation site.

It is well known in the art that improving cooling tower performance (i.e. the ability to extract an increased quantity of waste heat in a given surface) can lead to improved overall efficiency of a steam plant's conversion of heat to electric power and/or to increases in power output in particular conditions. Moreover, cost-effective methods of manufacture and assembly also improve the overall efficiency of cooling towers in terms of cost-effectiveness of manufacture and operation. Accordingly, it is desirable for cooling tower that are efficient in both in the heat exchange properties and assembly. The present invention addresses this desire.

Therefore it would desirous to have an economical, mechanical draft, modular cooling tower that is efficient not only in its heat exchange properties but also in its time required for assembly and cost for doing the same.

SUMMARY OF THE INVENTION

Embodiments of the present invention advantageously provides for a fluid, usually steam and method for a modular mechanical draft cooling tower for condensing said steam.

An embodiment of the invention includes a method for assembling a modular air cooled condenser extending along a vertical axis away from horizontal, comprising the steps of: assembling a first condenser bundle assembly having a first set of tubes having first and second ends, a steam manifold connected to the first ends of the tubes, and a condensate header connected to the second ends of the tubes; assembling a second condenser bundle having a second set of tubes having first and second ends, a steam manifold connected to the first ends of the tubes, and a condensate header connected to the second ends of the tubes; placing the first and second condenser bundle assemblies in to a container; transporting the container to a location upon which the modular air cooled condenser will be assembled; assembling a heat exchange delta by placing the first condenser bundle and the second condenser bundle; and positioning the heat exchange delta on a modular tower frame.

Another embodiment of the present invention includes a modular air cooled condenser extending along a vertical axis away from horizontal, comprising: means for assembling a first condenser bundle assembly having a first set of tubes having first and second ends, a steam manifold connected to the first ends of the tubes, and a condensate header connected to the second ends of the tubes; means for assembling a second condenser bundle assembly having a second set of tubes having first and second ends, a steam manifold connected to the first end of the tubes, and a condensate header connected to the second ends of the tubes; means for placing the first and second condenser bundle assemblies in to a container; means for transporting the container to a location upon which the modular air cooled condenser will be assembled; means for assembling a heat exchange delta by placing using the first condenser bundle and the second condenser bundle; and means for positioning the heat exchange delta on a modular tower frame.

Another embodiment of the present invention, A mechanical draft modular air cooled condenser that cools an industrial fluid is disclosed, comprising: a plenum with which at least one delta resides wherein said at least one delta comprises first condenser bundle having a first set of tubes having first and second ends, a steam manifold connected to the first ends of the tubes, and a condensate header connected to the second ends of the tubes; and a second condenser bundle having a second set of tubes having first and second ends, a steam manifold connected to the first ends of the tubes, and a condensate header connected to the second ends of the tubes; a support frame that supports said plenum; and a shroud that houses an air current generator.

In yet another embodiment of the present invention, a method for assembling a modular air cooled condenser extending along a vertical axis is disclosed, comprising: assembling a first condenser bundle having a first set of tubes having first and second ends and a condensate header connected to the second end of the tubes; assembling a second condenser bundle having a second set of tubes having first and second ends, and a condensate header connected to the second end of the tubes; placing the first and second condenser bundles in to a container; transporting the container to a location upon which the modular air cooled condenser will be assembled; assembling a heat exchange delta by placing using the first condenser bundle and the second condenser bundle; and positioning the heat exchange delta on a modular tower frame.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The above-mentioned and other features and advantages of this disclosure, and the manner of attaining them, will become more apparent and the disclosure itself will be better understood by reference to the following description of various embodiments of the disclosure taken in conjunction with the accompanying figures.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical, processing, and electrical changes may be made. It should be appreciated that any list of materials or arrangements of elements is for example purposes only and is by no means intended to be exhaustive. The progression of processing steps described is an example; however, the sequence of steps is not limited to that set forth herein and may be changed as is known in the art, with the exception of steps necessarily occurring in a certain order.

Figure 1:
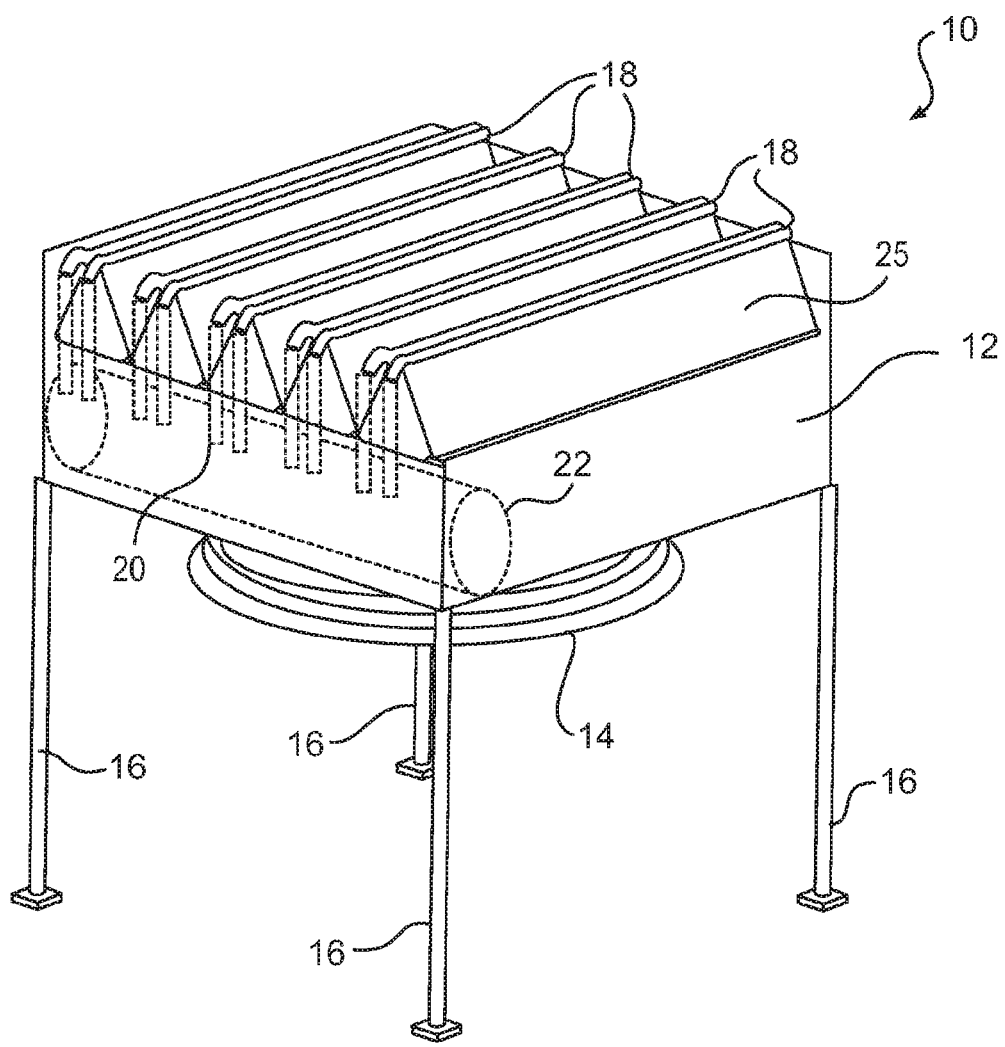
FIG. 1 is a perspective view of an air cooled condenser module in accordance with an embodiment of the present invention.

Turning now to FIG. 1, a modular air cooled condenser module, generally designated 10, is illustrated. The air cooled condenser module 10 generally includes a plenum 12, having an air current generator or fan disposed within a fan shroud or inlet bell 14 and a plurality of support columns or legs 16. The air cooled condenser module 10 further includes multiple A-type geometry deltas, each designated 18. Each delta 18 comprises two tube bundle assemblies 28 with a series of finned tubes to conduct heat transfer. The deltas 18 will be discussed in further detail below.

Figure 2:
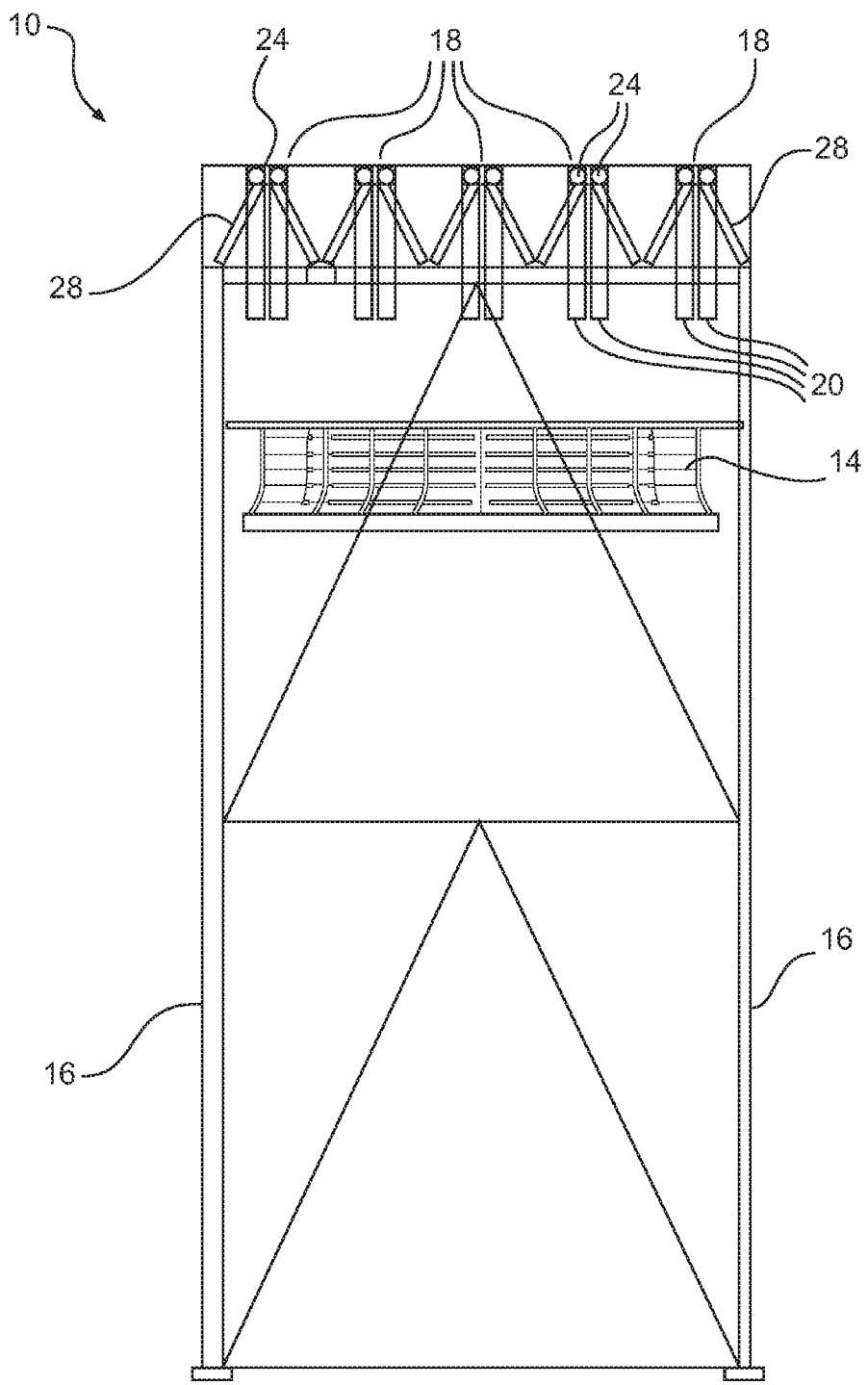
FIG. 2 is a schematic side view of the air cooled condenser module depicted in FIG. 1 in accordance with an embodiment of the present invention.
Figure 3:
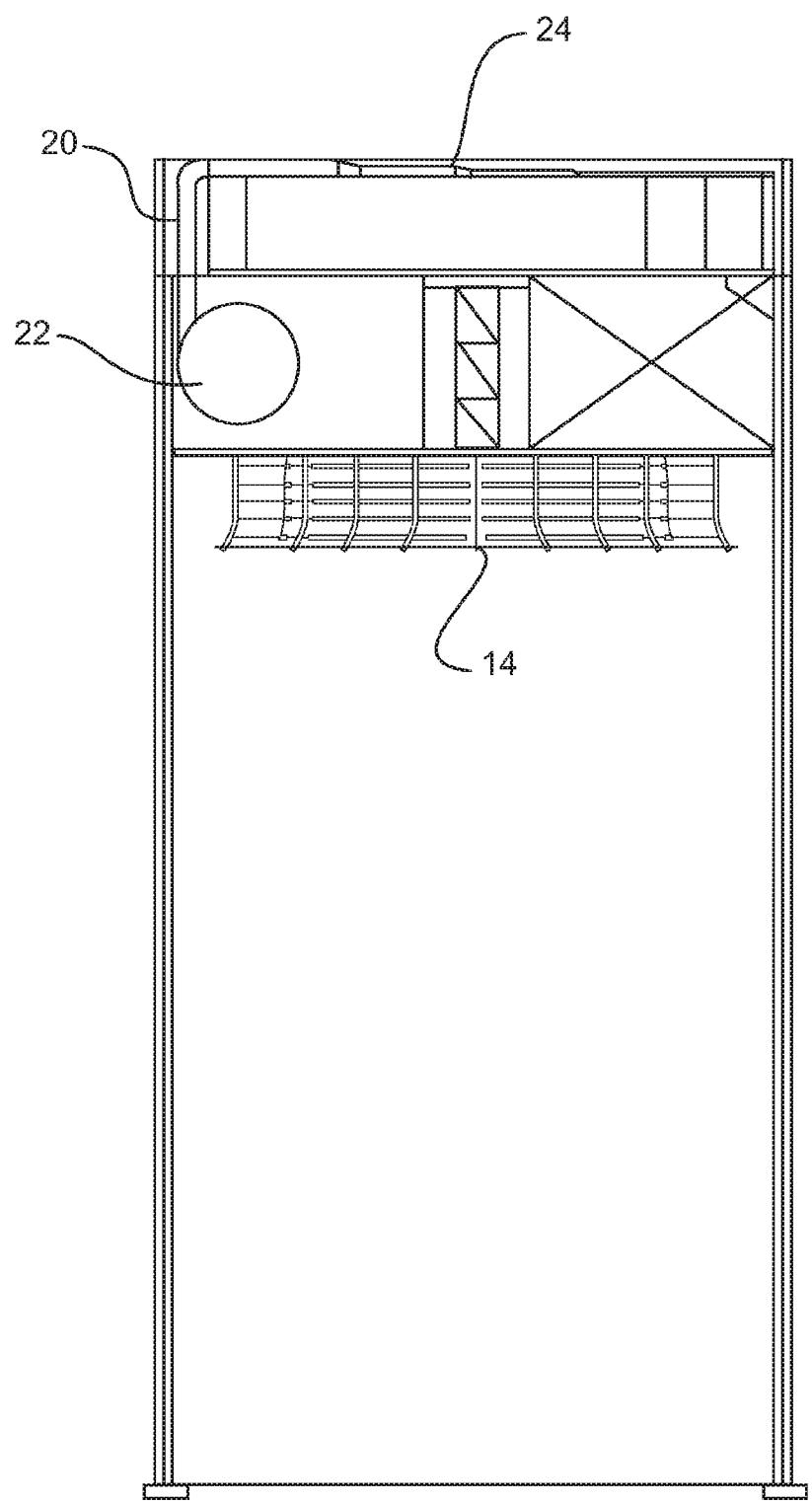
FIG. 3 is another schematic side view of the air cooled condenser module depicted in FIG. 1 in accordance with an embodiment of the present invention.

Turning now to FIGS. 2 and 3, schematic side views of the air cooled condenser 10 are depicted. As specifically illustrated in FIG. 2, the air cooled condenser employs risers 20 which are welded to the main steam duct 22. The risers 20 are connected to a steam manifold 24 which operates to keep the steam flow velocity more constant. This above described configuration is part the A-type condenser bundles 28 that are shipped as a unit from the factory, which will be discussed in further detail below. The condenser bundles 28 are preferably welded to the risers 20 via a transition piece 26 to accommodate the geometry of the steam manifold.

Figure 4:
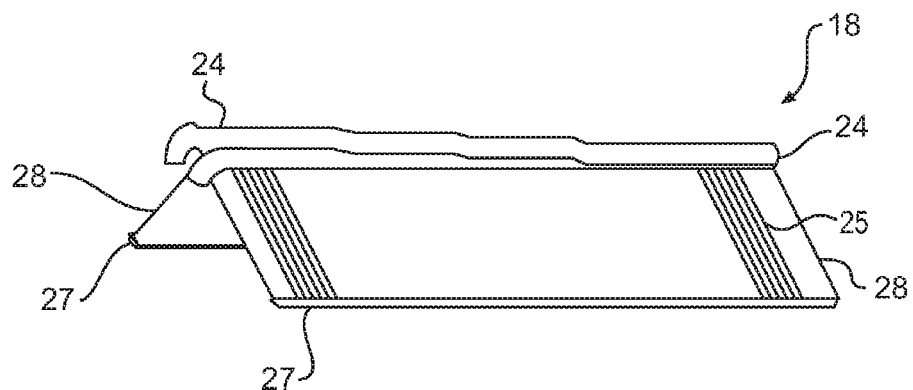
FIG. 4 is a perspective view of an A-type condenser configuration in accordance with an embodiment of the present invention.

Turning now to FIG. 4, a delta 18 is illustrated. As depicted, each delta 18 is comprised of two individual heat exchange bundle assemblies 28, each having a series of finned tubes. The individual tubes are approximately two (2) meters in length whereas the bundle length is approximately twelve (12) meters. As illustrated, each bundle assembly 28 is positioned at an angle to one another to form the A-type configuration of the delta 18. While the bundle assemblies 28 may be positioned at any desired angle, they preferably are positioned at an angle approximately twenty degrees (20°) to approximately thirty degrees (30°) from vertical and approximately sixty degrees (60°) to approximately seventy degrees (70°) from horizontal. More specifically, the bundle assemblies 28 are positioned at twenty-six degrees (26°) from vertical and sixty-four degrees (64°) from horizontal.

Each of the bundle assemblies 28 are assembled prior to shipping wherein each comprises a riser to header transition piece 26, steam manifold 24, finned tubes 25, and steam condensate headers 27. As can be seen in FIG. 1, due to the modular design and orientation of the bundle assemblies 28, the air cooled condenser design 10 has approximately five (5) times more tubes as compared to typical designs. Moreover, the embodiments of the current invention not only utilize five (5) times the tubes, but employ condenser tubes that are much shorter in length. As result of the aforementioned design and orientation, the steam velocity traveling through the tube bundles 28 is reduced as result of the increased number of tubes in combination with the reduced tube length, and therefore steam pressure drop within the deltas 18 is reduced, making the air cool condenser 10 more efficient.

Typically, turbine back pressure of an air cooled condenser or the like is limited by the maximum steam velocity in the tubes (to limit erosion) wherein the steam velocity is increasing with a decrease of back pressure (due to density of steam). Thus, due to the addition of tubes in accordance with the present invention, the steam is still maintained at the maximum allowable steam velocity but at a lower back pressure. The other limitation the current delta design addresses is that the pressure at the exit of the secondary bundles cannot be less than the vacuum group capability. This pressure typically results from turbine back pressure minus the pressure drop in ducting minus the pressure drop in the tubes. Accordingly, due to the reduced pressure drop in the tubes, the allowable turbine back pressure is lower with the delta 18 design.

Furthermore, the above-described bundle design also reduces the pressure drop within the individual delta 18. For example, the heat exchange that takes place via the deltas 18, is dependent upon the heat exchange coefficient, i.e., the mean temperature difference between air and steam and the exchange surface. Due to the reduced pressure drop as previously described, the mean pressure (average between inlet pressure and exit pressure) in the exchanger is higher with the design of the current condenser configuration 10. In other words, because steam is saturated, the mean steam temperature is also higher for the same heat exchange surface resulting in increased heat exchange.

Figure 5:
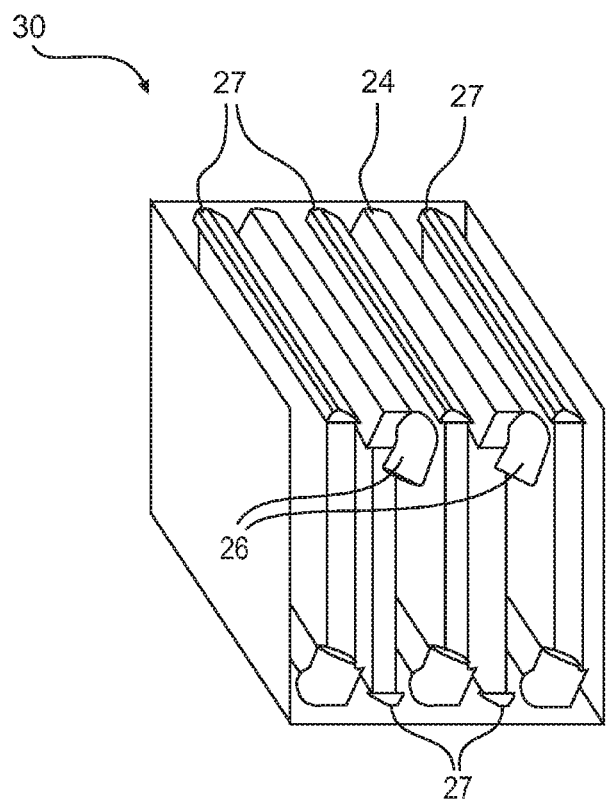
FIG. 5 illustrates the condenser bundles in a packaged arrangement for shipping in accordance with an embodiment of the present invention.

Turning now to FIG. 5, a transport container, generally designated 30 is illustrated. As the name suggests, the transport container 30 is used to transport the bundles 28, from the factory to the job site. As illustrated, the condenser bundles 28, are manufactured and assembled at the factory with the respective steam manifold 24 and steam condensate headers 27. While five (5) bundles are illustrated positioned in the transport container, more or less individual bundles may be shipped per container depending as needed or required.

Alternatively, the above described embodiments of the present employ tube bundles manufactured and assembled, prior to shipping, having steam manifold 24 and steam condensate headers 27, alternative embodiment bundles may not include a manifold prior to shipping. More specifically, in such embodiments, the tube bundles may be ship without steam manifolds 24 attached thereto. In said embodiments, the tube bundles 28 may be assembled in field to form the A-type configuration, as discussed above. However, instead of employing two steam manifolds, this alternative embodiment may employ a single steam manifold wherein the single steam manifold extends along the "apex" of the A configuration.

Figure 6:
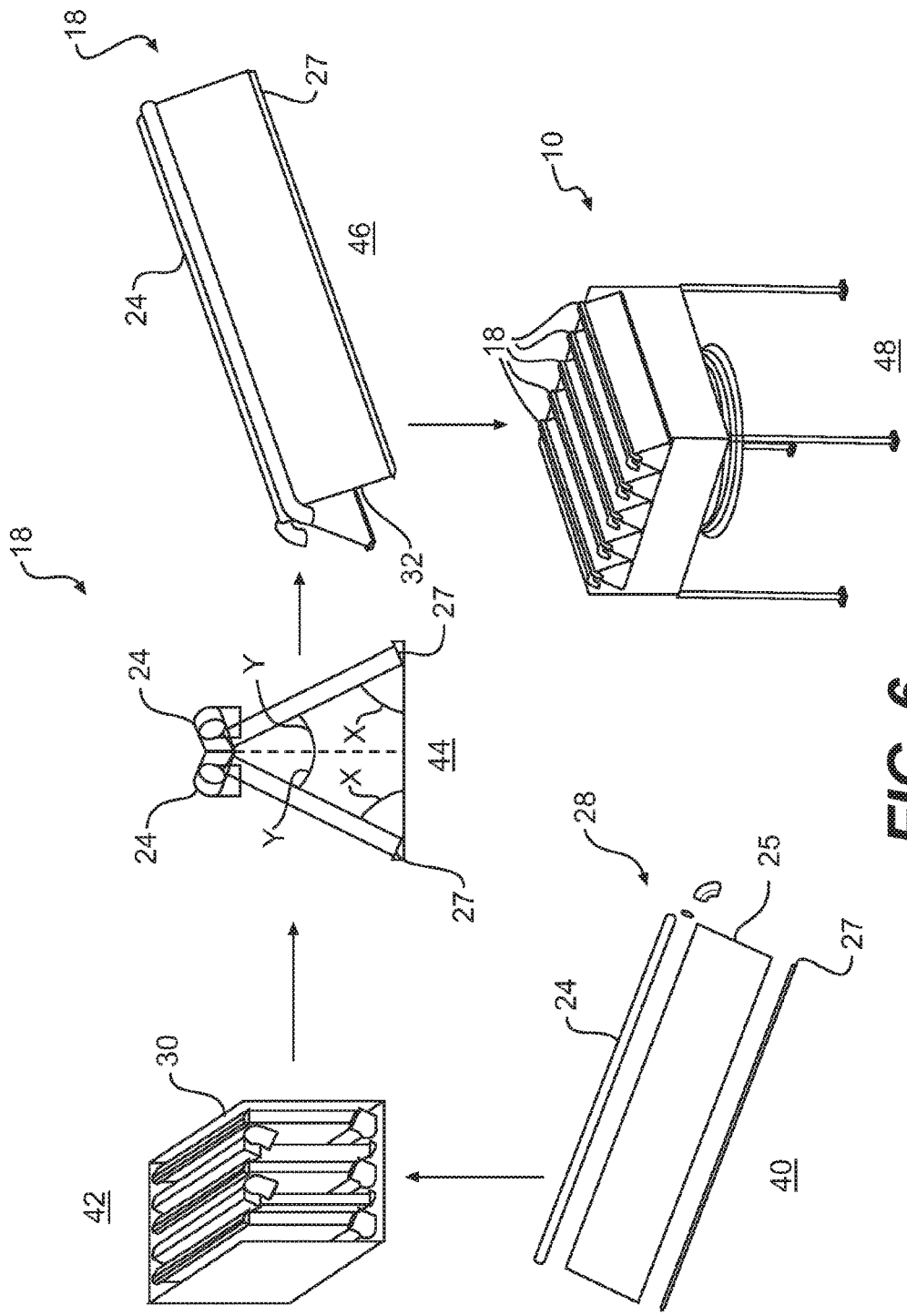
FIG. 6 schematically illustrates the steps of assembly of an air cooled condenser in accordance with an embodiment of the present invention.

Referring now to FIG. 6, a flow chart is illustrated, schematically depicting the steps of assembly of the air cooled condenser tower 10. As previously described, the individual tube bundles 28 are assembled prior to shipment to the job site, as referenced by numeral 40. Each individual bundle assembly 28 includes a plurality of finned tubes 25 along with a steam manifold 24 and steam condensate header 27. As previously discussed in connection with the previous figures of the specification, the bundle assemblies 28 are pre-manufactured at the factory prior to placing the individual bundle assemblies 28 in the shipping container 30 as identified by numeral 42. The shipping containers 30 are then shipped to the erection field site.

Next, the delta, generally indicated as 18, is assembled in the field as identified by numerals 44 and 46. As previously described, while the bundles may be positioned at any desired angle, they preferably are positioned at an angle (y) approximately twenty degrees (20°) to approximately thirty degrees (30°) from vertical and an angle (x) approximately sixty degrees (60°) to approximately seventy degrees (70°) from horizontal. More specifically, the bundles are positioned at twenty-six degrees (26.degree.) from vertical and sixty-four degrees (64°) from horizontal. As designated by numeral 46, a single A-type delta is illustrated 18 formed by two bundle assemblies 28 to form the "A" configuration. The bundle assemblies 28 self support one another in this configuration.

Turning now to the air cooled condenser module 10 as referenced by the numeral 48, it is depicted employing five deltas 18. As discussed above, the air cooled condenser is an improvement over current air cooled condenser types and it has a high "pre-fabrication" level which equates to reduced installation cost and reduced installation time. Moreover, the above-described design reduces the pressure drop, thereby providing a more efficient heat exchange apparatus.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, for example a forced draft air cooled condenser has been illustrated but an induced draft design can be adapted to gain the same benefits and, accordingly, all suitable modifications and equivalents may be resorted to that fall within the scope of the invention.

What is claimed:
1. A mechanical draft modular air cooled condenser comprising:
 a first condenser pair including:
  a first condenser bundle panel having a first top end and a first bottom end;
  a first manifold disposed near the first top end;
  a first condensate header connected to the first bottom end;

a second condenser bundle panel consecutive to the first condenser bundle panel, the second condenser bundle panel having a second top end and a second bottom end; and a second condensate header connected to the second bottom end, the second condensate header parallel to the first condensate header, the first bottom end of the first condenser bundle panel and the second bottom end of the second condenser bundle converging toward each other;

a second condenser pair including:

a third condenser bundle panel consecutive to the second condenser bundle panel, the third condenser bundle panel having a third top end and a third bottom end, the second top end of the second condenser bundle panel and the third top end of the third condenser bundle panel converging toward each other;

a second manifold disposed near the second top end and the third top end, the first condensate header and the second condensate header disposed horizontally between and vertically below the first manifold and the second manifolds;

a third condensate header connected to the third bottom end, the third condensate header parallel to the first condensate header and parallel to the second condensate header;

a fourth condenser bundle panel consecutive to the third condenser bundle panel, the fourth condenser bundle panel having a fourth top end and a fourth bottom end; and a fourth condensate header connected to the fourth bottom end, the fourth condensate header parallel to the third condensate header, the third bottom end of the third condenser bundle panel and the fourth bottom end of the fourth condenser bundle converging toward each other;

a shroud that houses a single fan, the single fan positioned to create a draft to flow over the first condenser bundle panel, over the second condenser bundle panel, over the third condenser bundle panel, and over the fourth condenser bundle panel; and a support frame that supports the first, second, third, and fourth condenser bundle panels.

2. The modular air cooled condenser of claim 1, wherein
the first condenser bundle panel includes a first set of tubes having first ends and second ends, the second ends lower than the first ends, and the first condensate header connected to the second ends of the first set of tubes;
the second condenser bundle panel includes a second set of tubes having third ends and fourth ends, the third ends lower than the fourth ends, and the second condensate header connected to the third fourth ends of the second set of tubes;
the third condenser bundle panel includes a third set of tubes having fifth ends and sixth ends, the sixth ends lower than the fifth ends, and the third condensate header connected to the sixth ends of the third set of tubes; and
the fourth condenser bundle panel includes a fourth set of tubes having seventh ends and eighth ends, the seventh ends lower than the eighth ends, and the fourth condensate header connected to the seventh ends of the fourth set of tubes.

3. The modular air cooled condenser according to claim 2, wherein the tubes of each of the first and second set of tubes have fins attached thereto.

4. The modular air cooled condenser according to claim 2, wherein the tubes of each of the third and fourth sets of tubes have fins attached thereto.

5. The modular air cooled condenser according to claim 2, wherein the tubes of the first set of tubes and the tubes of the second set of tubes have a length equal to approximately two meters.

6. The modular air cooled condenser according to claim 2, wherein the tubes of the third set of tubes and the tubes of the fourth set of tubes have a length equal to approximately two meters.

7. The modular air cooled condenser according to claim 1, wherein the first condenser bundle panel is positioned at an angle to vertical and horizontal and the second condenser bundle panel is positioned at an angle to vertical and to horizontal.

8. The modular air cooled condenser according to claim 7, wherein each of the first and second condenser bundle panels is positioned at an angle to horizontal equal to approximately sixty degrees to approximately seventy degrees and wherein each of the first and second condenser bundle panels is positioned at an angle to vertical equal to approximately twenty degrees to approximately thirty degrees.

9. The modular air cooled condenser according to claim 8, wherein the third condenser bundle panel is positioned at an angle to vertical and horizontal and the fourth condenser bundle panel is positioned at an angle to vertical and to horizontal.

10. The modular air cooled condenser according to claim 9, wherein each of the third and fourth condenser bundle panels is positioned at an angle to horizontal equal to approximately sixty-four degrees and wherein each of the third and fourth condenser bundle panels is positioned at an angle to vertical equal to approximately twenty-six degrees.

11. The modular air cooled condenser according to claim 1, wherein the first condenser bundle panel, the second condenser bundle panel, and a plane including the first manifold and the second manifold form a shape of a triangular prism.

12. A mechanical draft modular air cooled condenser comprising:

a first condenser pair including:

a first condenser bundle panel having a first top end and a first bottom end;

a first manifold disposed near the first top end;

a first condensate header connected to the first bottom end;

a second condenser bundle panel consecutive to the first condenser bundle panel, the second condenser bundle panel having a second top end and a second bottom end; and a second condensate header connected to the second bottom end, the second condensate header parallel to the first condensate header, the first top end of the first condenser bundle panel and the second top end of the second condenser bundle converging toward each other;

a second condenser pair including:

a third condenser bundle panel consecutive to the second condenser bundle panel, the third condenser bundle panel having a third top end and a third bottom end, the second bottom end of the second condenser bundle panel and the third bottom end of the third condenser bundle panel converging toward each other;

a third condensate header connected to the third bottom end, the third condensate header parallel to the first condensate header and parallel to the second condensate header;

a fourth condenser bundle panel consecutive to the third condenser bundle panel, the fourth condenser bundle panel having a fourth top end and a fourth bottom end;

a fourth condensate header connected to the fourth bottom end, the fourth condensate header parallel to the third condensate header, the third top end of the third condenser bundle panel and the fourth top end of the fourth condenser bundle converging toward each other; and a second manifold disposed near the third top end and the fourth top end, the second condensate header and the third condensate header disposed horizontally between and vertically below the first manifold and the second manifold;

a shroud that houses a single fan, the single fan positioned to create a draft to flow over the first condenser bundle panel, over the second condenser bundle panel, over the third condenser bundle panel, and over the fourth condenser bundle panel; and a support frame that supports the first, second, third, and fourth condenser bundle panels.

13. The modular air cooled condenser of claim 12, wherein
the first condenser bundle panel includes a first set of tubes having first ends and second ends, the first ends lower than the second ends, and the first condensate header connected to the first ends of the first set of tubes;
the second condenser bundle panel includes a second set of tubes having third ends and fourth ends, the fourth ends lower than the third ends, and the second condensate header connected to the fourth ends of the second set of tubes;
the third condenser bundle panel includes a third set of tubes having fifth ends and sixth ends, the fifth ends lower than the sixth ends, and the third condensate header connected to the fifth ends of the third set of tubes; and
the fourth condenser bundle panel includes a fourth set of tubes having seventh ends and eighth ends, the eighth ends lower than the seventh ends, and the fourth condensate header connected to the eighth ends of the fourth set of tubes.

14. The modular air cooled condenser according to claim 13, wherein the tubes of each of the first, second, third, and fourth set of tubes have fins attached thereto.

15. The modular air cooled condenser according to claim 13, wherein the tubes of the first set of tubes, the tubes of the second set of tubes, the tubes of the third set of tubes, and the tubes of the fourth set of tubes have a length equal to approximately two meters.

16. The modular air cooled condenser according to claim 12, wherein the first condenser bundle panel, the second condenser bundle panel, the third condenser bundle panel, and the fourth condenser bundle panel are each positioned at an angle to vertical and an angle to the horizontal.

17. The modular air cooled condenser according to claim 16, wherein the angle to horizontal is equal to approximately sixty degrees to approximately seventy degrees and the angle to the vertical is equal to approximately twenty degrees to approximately thirty degrees.

18. The modular air cooled condenser according to claim 16, wherein the angle to horizontal is equal to approximately sixty-four degrees and the angle to vertical is equal to approximately twenty-six degrees.

19. The modular air cooled condenser according to claim 12, wherein the second condenser bundle panel, the third condenser bundle panel, and a plane including the first manifold and the second manifold form a shape of a triangular prism.

20. A mechanical draft modular air cooled condenser comprising:
a condenser module including:
a first condenser bundle having a first set of tubes having first ends and second ends, the second ends lower than the first ends, and a first condensate header connected to the second ends of the first set of tubes;
a second condenser bundle consecutive to the first condenser bundle in the condenser module, the second condenser bundle having a second set of tubes having third ends and fourth ends, the third ends lower than the fourth ends, and a second condensate header connected to the third ends of the second set of tubes, the second condensate header parallel to the first condensate header, the second condensate header consecutive to the first condensate header;
a third condenser bundle consecutive to the second condenser bundle in the condenser module, the third condenser bundle having a third set of tubes having fifth ends and sixth ends, the sixth ends lower than the fifth ends, and a third condensate header connected to the sixth ends of the third set of tubes, the third condensate header parallel to the first condensate header and parallel to the second condensate header, the third condensate header consecutive to the second condensate header, wherein the second condensate header and the third condensate header are disposed in a same plane, wherein the second condenser bundle is positioned at an angle from a vertical axis in a clockwise direction, the third condenser bundle is positioned at the angle from the vertical axis in a counter-clockwise direction, the angle being approximately twenty degrees to approximately thirty degrees; and
a fourth condenser bundle consecutive to the third condenser bundle in the condenser module, the fourth condenser bundle having a fourth set of tubes having seventh ends and eighth ends, the seventh ends lower than the eighth ends, and a fourth condensate header connected to the seventh ends of the fourth set of tubes, the fourth condensate header parallel to the third condensate header, the fourth condensate header consecutive to the third condensate header, wherein the first condensate header, the second condensate header, the third condensate header, and the fourth condensate header are substantially horizontal;
a shroud that houses a single fan, the single fan positioned to create a draft to flow over the first condenser bundle, over the second condenser bundle, over the third condenser bundle, and over the fourth condenser bundle; and a support frame that supports the first, second, third, and fourth condenser bundles.

\* \* \* \* \*

UNITED STATES PATENT AND TRADEMARK OFFICE
CERTIFICATE OF CORRECTION

PATENT NO. : 10,551,126 B2
APPLICATION NO. : 16/196840
DATED : February 4, 2020
INVENTOR(S) : Michel Vouche et al.

Page 1 of 1

It is certified that error appears in the above-identified patent and that said Letters Patent is hereby corrected as shown below:

In the Claims

Column 7, Line 24 (Claim 1): delete "manifolds" and insert --manifold--.

Column 7, Line 56 (Claim 2): after "third" delete "fourth".

Column 9, Line 64 (Claim 16): between "angle to" and "horizontal" delete "the".

Column 10, Line 1 (Claim 17): between "angle to" and "vertical" delete "the".

Signed and Sealed this
Fourth Day of May, 2021

Drew Hirshfeld
*Performing the Functions and Duties of the
Under Secretary of Commerce for Intellectual Property and
Director of the United States Patent and Trademark Office*